United States Patent [19]

Ibata et al.

[11] 4,212,790

[45] Jul. 15, 1980

[54] RESIN CONCRETE COMPOSITION

[75] Inventors: Jyoji Ibata; Yukio Fujita; Naoya Kominami, all of Fuji, Japan

[73] Assignee: Asahi Kasei Kogyo Kabushiki Kaisha, Osaka, Japan

[21] Appl. No.: 959,754

[22] Filed: Nov. 13, 1978

[30] Foreign Application Priority Data

Nov. 11, 1977 [JP] Japan .................................. 52-134682

[51] Int. Cl.² .............................................. C08K 3/36
[52] U.S. Cl. .................................................. 260/40 R
[58] Field of Search ............................. 260/861, 40 R

[56] References Cited

U.S. PATENT DOCUMENTS

| | | | |
|---|---|---|---|
| 3,078,249 | 2/1963 | Russell | 260/40 R |
| 3,296,336 | 1/1967 | Engelhardt | 260/861 |
| 3,296,337 | 1/1967 | Zimmerman | 260/861 X |
| 3,896,098 | 7/1975 | Lasher | 260/861 X |

Primary Examiner—Sandra M. Person
Attorney, Agent, or Firm—Armstrong, Nikaido, Marmelstein & Kubovcik

[57] ABSTRACT

A resin concrete composition comprising an allyl ether-modified unsaturated polyester, at least one ethylenically unsaturated monomer and an aggregate, 20% or more of the total dicarboxylic acid units in said allyl ether-modified unsaturated polyester being unsaturated dicarboxylic acid units, the ratio of the number of allyl groups/the number of molecules of unsaturated dicarboxylic acid in said allyl ether-modified unsaturated polyester being 1/10 to 4/1, and said unsaturated polyester having a number average molecular weight of 800–7000. Said composition is suitable for use as thick molded articles and excellent in low temperature curability and adhesion between aggregate and resin. The cured composition is resistant to crack formation and excellent in mechanical properties.

9 Claims, No Drawings

RESIN CONCRETE COMPOSITION

BACKGROUND OF THE INVENTION

1. Field of the Invention

This invention relates to a resin concrete composition particularly suitable for use as thick molded articles and excellent in low temperature curability, the main ingredients of which are an unsaturated polyester resin having allyl ether group and an aggregate. When the term "resin concrete" is simply used herein, it means to cover both resin mortar and resin concrete.

2. Description of the Prior Art

Hitherto, resin mortars and resin concretes of unsaturated polyester or the like have been used in various fields because of their superiority in mechanical strength and chemical properties to inorganic type concretes. However, their use is limited owing to cracks caused by the shrinkage and heat evolution at the time of cure, the deterioration of physical properties caused by the incomplete adhesion to aggregate and the incomplete cure at low temperatures. Otherwise, these problems are solved at the sacrifice of the excellent characteristic properties which they originally have.

With regard to the prevention of crack, a few proposals have been made hitherto. One of the proposals is addition of a thermoplastic resin to the unsaturated polyester resin or the like. In this case, the thermal expansion of said thermoplastic resin due to heat evaluation at the time of cure is utilized to make the shrinkage low. Another proposal is to increase the elongation of resin. However, the addition of thermoplastic resin is undesirable because it increases the viscosity of resin, injures the workability of resin and deteriorates the mechanical properties of resin. In addition, in the case of large-sized molded articles, the local generation of heat sometimes causes sudden boiling of crosslinking agent, etc. and results in cracks. On the other hand, an increase in elongation of resin is accompanied by deterioration in mechanical strength, creep characteristics and chemical properties, so that the second proposal is considerably limited in application.

With regard to the enhancement of adhesion to aggregate, there have been proposed use of silane coupling agent and treatment with resin acid. However, they are unemployable from the economical point of view because of the high costs of operation and agent.

With regard to the incomplete cure at low temperatures, it is made possible to complete the curing by using a large amount of a curing catalyst or using a catalyst for low temperature. However, these are undesirable because they deteriorate mechanical strengths.

In view of the situations mentioned above, the present inventors have earnestly conducted studies with the aim of discovering a resin composition for use in resin mortar or resin concrete excellent in adhesion to aggregate, insusceptible to crack formation and excellent in low temperature curability. As a result, it has been found that a combination of an allyl ether-modified unsaturated polyester, an ethylenically unsaturated monomer and an aggregate is effective.

It is, therefore, an object of this invention to provide a resin concrete composition free from the above-mentioned disadvantages.

Other objects and advantages of this invention will become apparent from the following description.

SUMMARY OF THE INVENTION

According to this invention, there is provided a resin mortar composition or a resin concrete composition comprising an allyl ether-modified unsaturated polyester, at least one ethylenically unsaturated monomer and an aggregate, 20 mole percent or more of the total dicarboxylic acid units in said allyl ether-modified unsaturated polyester being units of unsaturated dicarboxylic acid, the ratio of the number of allyl groups/the number of molecules of unsaturated dicarboxylic acid being 1/10 to 4/1, and said unsaturated polyester having a number average molecular weight of 800–7000.

DETAILED DESCRIPTION OF THE INVENTION

The allyl ether-modified unsaturated polyester of this invention is obtained by condensing, in a conventional manner, an unsaturated dicarboxylic acid and, if necessary, a saturated dicarboxylic acid with a dialcohol having an allyl ether group and, if necessary, other dialcohols.

In the condensation reaction for obtaining said allyl ether-modified unsaturated polyester, the ratio between the dicarboxylic acid component and the dialcohol component is not particularly limited. Similarly to the case of general unsaturated polyesters, however, it is preferable that they are used in equimolar quantities or the alcohol component is used in small excess.

Said acid component and alcohol component are not limited to bifunctional ones, but they may contain polyfunctional ones such as trifunctional or tetrafunctional ones or monofunctional ones, so far as their amount is in the range enough to give, in the substantial condensation reaction, products having a number average molecular weight of 800–7000 without causing gelation. Particularly regarding the compound having allyl ether group, it is economical to use a mixture of monoalcohol, diol, triol and the like from the standpoint of omitting the purification process.

Examples of said unsaturated dicarboxylic acid include maleic anhydride, maleic acid, fumaric acid, itaconic acid, citraconic acid and the like. Examples of said saturated dicarboxylic acid include phthalic anhydride, phthalic acid, isophthalic acid, terephthalic acid, HET acid, adipic acid, sebacic acid and the like.

Said alcohol having allyl ether group is a reaction product between a polyhydric alcohol having a functionality of 3 or more and allyl alcohol. Its examples include mono- and di-allyl ethers of glycerin, trimethylolethane, trimethylolpropane and the like and mono-, di- and tri-allyl ethers of pentaerythritol.

Examples of said dialcohol include ethylene glycol, propylene glycol, diethylene glycol, triethylene glycol, dipropylene glycol, 1,4-butanediol, neopentyl glycol, 1,6-hexanediol and the like.

Examples of said alcohol having a functionality of 3 or more include glycerin, methylolpropane, pentaerythritol, tetramethylolmethane and the like.

In the allyl ether-modified unsaturated polyester, the proportion of unsaturated dicarboxylic acid units to the total dicarboxylic acid units is 20 mole percent or more, and preferably 40 mole percent or more. The ratio of the number of allyl groups/the number of molecules of unsaturated dicarboxylic acid is 1/10–4/1 and preferably 1/5–2/1.

If the proportion of unsaturated dicarboxylic acid unit is smaller than 20 mole percent, the mechanical strength decreases. When the number of allyl groups is less than 0.1 time the number of molecules of unsaturated dicarboxylic acid, the absolute quantity of unsaturated dicarboxylic acid should be increased in order to give the composition practically acceptable physical properties. In this case, cracks tend to form at the time of curing. If the absolute quantity of allyl group is too small, the curability at low temperatures becomes poor. If the number of allyl groups exceeds 4 times the number of molecules of unsaturated dicarboxylic acids, cracks form at the time of curing or, even if no cracks form, the product is so brittle as to be unusable practically.

Said allyl ether-modified unsaturated polyester has a number average molecular weight of 800–7000, preferably 1000–3000. If the number average molecular weight is less than 800, cracks form at the time of curing or, even if no cracks form, the product cannot have practically acceptable physical properties. If the number average molecular weight is more than 7000, the viscosity of the resin increases and the miscibility and moldability of the resin become poor.

Said ethylenically unsaturated monomers include monofunctional and polyfunctional monomers. Examples of the monofunctional monomers include styrene derivatives such as styrene, vinyltoluene, chlorostyrene, α-methylstyrene and the like; allyl alcohol derivatives such as allyl alcohol, glycerin monoallyl ether, pentaerythritol monoallyl ether and the like; acrylates and methacrylates such as methyl acrylate, methyl methacrylate, ethyl acrylate, ethyl methacrylate, butyl acrylate, butyl methacrylate and the like; hydroxyalkyl acrylates and methacrylates such as hydroxyethyl acrylate, hydroxyethyl methacrylate, hydroxypropyl acrylate, hydroxypropyl methacrylate, hydroxybutyl acrylate, hydroxybutyl methacrylate, 2,3-dihydroxypropyl acrylate, 2,3-dihydroxypropyl methacrylate, 2,3-dihydroxybutyl acrylate, 2,3-dihydroxybutyl methacrylate and the like; and polyhydric alcohol esters of unsaturated acids such as ethylene glycol fumarate, propylene glycol fumarate and the like.

Examples of the polyfunctional monomers include diacrylates and dimethacrylates of polyethylene glycols (molecular weight 1500 or less) or polypropylene glycols (molecular weight 1500 or less) such as ethylene glycol diacrylate, ethylene glycol dimethacrylate, propylene glycol diacrylate, propylene glycol dimethacrylate, diethylene glycol diacrylate, diethylene glycol dimethacrylate and the like; and trifunctional and tetrafunctional acrylates and methacrylates such as trimethylolethane triacrylate, trimethylolpropane trimethacrylate, tetramethylolmethane tetramethacrylate and the like. Diallyl phthalate, glycerin diallyl ether, pentaerythritol diallyl ether and divinylbenzene are also included.

Among the above-mentioned ethylenically unsaturated monomers, acrylic esters and/or methacrylic esters are particularly preferable in this invention in that they are excellent in miscibility and adhesion and can give excellent mechanical properties even when the mixing time is short.

Articles having particularly excellent mechanical strengths can be obtained when said ethylenically unsaturated monomer is used in the form of such a mixture that the molar ratio of monofunctional monomer to polyfunctional monomer is in the range of 1/1 to 1/20.

Although the ratio of the allyl ether-modified unsaturated polyester to the ethylenically unsaturated monomer of this invention is not particularly limited, it is preferably in the range of 30/70 to 70/30 by weight.

As the aggregate, conventional aggregates in resin mortars and resin concretes, such as river sand, sea sand, siliceous sand, macadam and the like are used in this invention.

The amount of aggregate is not particularly limited and should be determined depending upon the particle size and particle size distribution of aggregate and the physical properties required for the resin mortar or resin concrete. Preferably, however, said aggregate is used in an amount of 200–1500 parts by weight per 100 parts by weight of the sum of the unsaturated polyester and the ethylenically unsaturated monomer of this invention.

It is effective to add, in addition to the above, an inorganic or organic filler, particularly fine powder of calcium carbonate, clay, talc, aluminum hydroxide or the like. If necessary, the composition may also be reinforced with a fibrous material such as glass, asbestos, rock wool, iron, stainless steel or the like or organic fiber such as polyester fiber, Nylon fiber, Vinylon fiber, cotton, pulp or the like.

Although the resin mortar or resin concrete composition of this invention can be cured by means of, for example, light, heat or high energy radiations even in the absence of crosslinking catalyst, it is preferable to use an appropriate crosslinking catalyst. As said crosslinking catalyst, a combined catalyst consisting of benzoyl peroxide and dimethylaniline or diethylaniline and a combined catalyst consisting of methyl ethyl ketone peroxide and an organic metal compound soluble in the reaction system such as cobalt naphthenate or cobalt octanoate are preferable.

Since the resin mortar composition and resin concrete composition of this invention are excellent in adhesion to aggregate, they give a resin mortar or a resin concrete free from cracks and excellent in physical properties such as bending strength, compression strength, etc. The composition of this invention is particularly suitable for the production of large-sized, thick molded articles such as foundation of large-sized machines, rolled-fill-type roller, mold material for compression molding, etc.

DESCRIPTION OF PREFERRED EMBODIMENTS

This invention is illustrated below with reference to the following Examples, which are by way of not limitation but illustration.

In the Examples, all the values were measured by the following methods:

Bending strength was determined by loading, at a speed of 2 mm/minute, the center of a 2 cm×2 cm test piece put on two supports arranged at a distance of 10 cm, and measuring the load when the test piece was broken.

Compression strength was determined by loading, at a speed of 2 mm/minute, a test piece having an area of 2 cm×2 cm and height of 2 cm, and measuring the load when the test piece was broken.

In the Examples, all the parts and % are by weight.

EXAMPLES 1–6

Into a reaction vessel were charged 0.8 mole of maleic anhydride, 0.2 mole of phthalic acid (the proportion of unsaturated dicarboxylic acid to total dicarboxylic acids: 80 mole %), 0.6 mole of propylene glycol, and 0.5 mole of pentaerythritol diallyl ether (the ratio of the number of allyl groups to the number of molecules of unsaturated dicarboxylic acid: 1/0.8), they were reacted in the usual way at 190°–200° C. for about 15 hours to obtain an unsaturated polyester having a number average molecular weight of 3,500. To 50 parts of the unsaturated polyester was added the ethylenically unsaturated monomer shown in Table 1 to prepare resins. From the resins, resin concretes were prepared according to the formulation shown below. After ageing at 20° C. for 3 days, bending strength and compression strength were measured. The results are shown in Table 1.

| Formulation: | |
|---|---|
| Resin | 100 (parts) |
| Calcium carbonate (Whiton B, manufactured by Shiraishi Calcium K. K.) | 100 |
| Sand | 700 |
| Cobalt naphthenate (purity 6%) | 0.5 |
| Methyl ethyl ketone peroxide (purity 55%, Permeck N, manufactured by Nippon Yushi K. K.) | 2 |

REFERENCE EXAMPLES 1–5 and EXAMPLE 7

At the charging ratio shown in Table 2, the components shown in Table 2 were reacted in usual way at 190°–200° C. for about 15 hours to obtain an unsaturated polyester. To the unsaturated polyester was added an equal weight of styrene monomer to obtain a resin. The resin was made into a composition according to the formulation shown below, its curability was measured after allowing the composition to stand at 0° C. for one day, and its bending and compression strengths were measured after allowing the composition to stand at 20° C. for 3 days. The results are shown in Table 2.

| Formulation: | |
|---|---|
| Resin | 100 (parts) |
| Sand | 500 |
| Cobalt naphthenate (purity 6%) | 0.5 |
| Methyl ethyl ketone peroxide (purity 55%, Permeck N, manufactured by Nippon Yushi K. K.) | 2 |

Table 1

| | | Example 1 | | Example 2 | | Example 3 | |
|---|---|---|---|---|---|---|---|
| Ethylenically unsaturated monomer (part) | | Styrene (50) | | Methyl methacrylate (50) | | 2-Hydroxyethyl methacrylate (50) | |
| Mixing time (minute) | | 1 | 3 | 1 | 3 | 1 | 3 |
| Physical properties | Bending strength (kg/cm$^2$) | 210 | 290 | 295 | 290 | 285 | 295 |
| | Compression strength (kg/cm$^2$) | 670 | 940 | 910 | 900 | 890 | 930 |
| | | Example 4 | | Example 5 | | Example 6 | |
| | | Diethylene glycol dimethacrylate (50) | | 2-Hydroxyethyl methacrylate (40) Triethylene glycol dimethacrylate (10) | | Styrene (40) Diethylene glycol dimethacrylate (10) | |
| | | 1 | 3 | 1 | 3 | 1 | 3 |
| | | 310 | 300 | 325 | 330 | 250 | 305 |
| | | 960 | 960 | 1030 | 1050 | 750 | 950 |

Table 2

| | Referential Example 1 | | Referential Example 2 | | Referential Example 3 | |
|---|---|---|---|---|---|---|
| Composition of charged components (molar ratio) | MA | 0.5 | MA | 0.18 | MA | 1.0 |
| | PA | 0.5 | PA | 0.82 | PDA | 0.09 |
| | PG | 1.1 | GMA | 0.5 | GMA | 1.0 |
| | | | PG | 0.6 | | |
| Ratio of number of allyl groups/number of molecules of unsaturated dicarboxylic acid | 0 | | 0.5/0.8 | | 0.09/1.0 | |
| Proportion of unsaturated dicarboxylic acid to total dicarboxylic acids (mole %) | 50 | | 18 | | 100 | |
| Number average molecular weight | 3,000 | | 2,400 | | 3,500 | |
| Curing state of resin concrete  0° C. × 24 hrs. | Uncured | | Cured | | Uncured | |
| 20° C. × 24 hrs. | Cured | | Cured | | Cured | |
| Bending strength (kg/cm$^2$) | 140 | | 90 | | 130 | |
| Compression strength (kg/cm$^2$) | 400 | | 270 | | 380 | |
| | Referential Example 4 | | Referential Example 5 | | Example 7 | |
| | MA | 0.4 | MA | 0.18 | The same as in Example 1 | |
| | PA | 0.6 | PA | 0.82 | | |
| | PDA | 0.9 | PDA | 0.9 | | |
| | PG | 0.2 | PG | 0.3 | | |
| | 1.8/0.4 | | 1.8/0.18 | | 1/0.8 | |
| | 40 | | 18 | | 80 | |

Table 2-continued

|  |  |  |  |
|---|---|---|---|
|  | 2,500 | 2,300 | 3,100 |
|  | Cured | Cured | Cured |
|  | Cracked | Cracked | Cured |
|  | — | — | 330 |
|  | — | — | 920 |

(Notes)
MA: maleic anhydride;
PG: propylene glycol;
PDA: pentaerythritol diallyl ether
PA: phthalic anhydride;
GMA: glycerin monoallyl ether;
The mixing time of resin concrete was 3 minutes.

EXAMPLES 8–13

At the charging ratio shown in Table 3, the components shown in Table 3 were reacted in usual way at 190°–200° C. for about 15 hours to obtain an unsaturated polyester having a number average molecular weight of 2,000 to 3,000. To 50 parts of the unsaturated polyester was added the ethylenically unsaturated monomer shown in Table 3 and made into a composition according to the same formulation as in Example 1. Its curability was measured after allowing the composition to stand at 0° C. for one day, and its bending and compression strengths were measured after allowing the composition to stand at 20° C. for 3 days. The results are shown in Table 3.

Table 3

| | Example 8 | Example 9 | Example 10 |
|---|---|---|---|
| Composition of charged components (molar ratio) | MA 0.7<br>PA 0.3<br>PDA 0.4<br>PTA 0.05<br>PG 0.55 | MA 1.0<br>GMA 1.1 | MA 0.7<br>PA 0.3<br>GMA 0.6<br>GDA 0.1<br>G 0.03<br>EG 0.4 |
| Ratio of number of allyl groups/number of molecules of unsaturated dicarboxylic acid | 0.8/0.7 | 1.1/1.0 | 0.8/0.7 |
| Proportion of unsaturated dicarboxylic acids to total dicarboxylic acids (mole %) | 70 | 100 | 70 |
| Ethylenically unsaturated monomer (part) | Styrene (50) | Diethylene glycol dimethacrylate (50) | 2-Hydroxyethyl methacrylate (50) |
| Curing state (° C. × 24 hrs.) | Good | Good | Good |
| Bending strength (kg/cm$^2$) | 270 | 295 | 290 |
| Compression strength (kg/cm$^2$) | 790 | 790 | 800 |

| Example 11 | Example 12 | Example 13 |
|---|---|---|
| MA 0.7<br>AA 0.3<br>PDA 0.5<br>PG 0.5 | The same as the left | The same as the left |
| 1.0/0.7 | 1.0/0.7 | 1.0/0.7 |
| 70 | 70 | 70 |
| Styrene (50) | 2-Hydroxyethyl methacrylate (50) | 2-Hydroxyethyl methacrylate (35)<br>Diethylene glycol dimethacrylate (15) |
| Good | Good | Good |
| 285 | 310 | 330 |
| 805 | 850 | 920 |

(Notes)
MA: maleic anhydride;
PG: propylene glycol;
AA: adipic acid,
PTA: pentaerythritol triallyl ether;
PDA: pentaerythritol diallyl ether;
GDA: glycerin diallyl ether;
GMA: glycerin monoallyl ether;
EG: ethylene glycol
G: glycerin;
PA: phthalic anhydride;
The mixing time of resin concrete was 3 minutes.

What is claimed is:

1. A resin concrete composition comprising an allyl ether-modified unsaturated polyester, at least one ethylenically unsaturated monomer and an aggregate, 20 mole percent or more of the total dicarboxylic acid units in said allyl ether-modified unsaturated polyester being unsaturated dicarboxylic acid units, the ratio of the number of allyl groups/the number of molecules of unsaturated dicarboxylic acid in said unsaturated polyester being 1/10 to 4/1, and said unsaturated polyester having a number average molecular weight of 800 to 7000.

2. A resin concrete composition according to claim 1, wherein 40 mole percent or more of the total dicarboxylic acid units in said allyl ether-modified unsaturated polyester is unsaturated dicarboxylic acid units.

3. A resin concrete composition according to claim 1, wherein the ratio of the number of allyl groups/the number of molecules of unsaturated dicarboxylic acid is 1/5 to 2/1.

4. A resin concrete composition according to claim 1, wherein said allyl ether-modified polyester has a number average molecular weight of 1000 to 3000.

5. A resin concrete composition according to claim 1, 2, 3 or 4, wherein the ethylenically unsaturated monomer is selected from the group consisting of styrene derivatives, allyl alcohol derivatives, alkyl acrylates, alkyl methacrylates, hydroxyalkyl acrylates, hydroxyalkyl methacrylates, polyhydric alcohol esters of unsaturated acids, diacrylates and dimethacrylates of polyethylene glycol or polypropylene glycol having a molecular weight of 1500 or less, and trifunctional and tetrafunctional acrylates and methacrylates.

6. A resin concrete composition according to claim 5, wherein the ethylenically unsaturated monomer is selected from the group consisting of styrene, vinyltoluene, chlorostyrene, α-methylstyrene, allyl alcohol, glycerin monoallyl ether, pentaerythritol monoallyl ether, methyl acrylate, methyl methacrylate, ethyl acrylate, ethyl methacrylate, butyl acrylate, butyl methacrylate, hydroxyethyl acrylate, hydroxyethyl methacrylate, hydroxypropyl acrylate, hydroxypropyl methacrylate, hydroxybutyl acrylate, hydroxybutyl methacrylate, 2,3-dihydroxypropyl acrylate, 2,3-dihydroxypropyl methacrylate, 2,3-dihydroxybutyl acrylate, 2,3-dihydroxybutyl methacrylate, ethylene glycol fumarate, propylene glycol fumarate, ethylene glycol diacrylate, ethylene glycol dimethacrylate, propylene glycol diacrylate, propylene glycol dimethacrylate, diethylene glycol diacrylate, diethylene glycol dimethacrylate, trimethylolethane triacrylate, trimethylolpropane trimethacrylate, tetramethylolmethane tetramethacrylate, diallyl phthalate, glycerin diallyl ether, pentaerythritol diallyl ether and divinylbenzene.

7. A resin concrete composition according to claim 5, wherein the ethylenically unsaturated monomer is styrene, methyl methacrylate, 2-hydroxyethyl methacrylate, diethylene glycol dimethacrylate, a mixture of 2-hydroxyethyl methacrylate and triethylene glycol dimethacrylate or a mixture of styrene and diethylene glycol dimethacrylate.

8. A composition according to claim 5, wherein the ethylenically unsaturated monomer is an acrylic ester, a methacrylic ester or a mixture thereof.

9. A composition according to claim 5, wherein the ethylenically unsaturated monomer is a mixture of a monofunctional monomer and a polyfunctional monomer at a molar ratio of 1/1 to 1/20.

* * * * *